(12) United States Patent
Horvitz et al.

(10) Patent No.: US 7,565,403 B2
(45) Date of Patent: Jul. 21, 2009

(54) USE OF A BULK-EMAIL FILTER WITHIN A SYSTEM FOR CLASSIFYING MESSAGES FOR URGENCY OR IMPORTANCE

(75) Inventors: Eric J. Horvitz, Kirkland, WA (US); Johnson T. Apacible, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 922 days.

(21) Appl. No.: 10/609,818

(22) Filed: Jun. 30, 2003

(65) Prior Publication Data

US 2004/0039786 A1 Feb. 26, 2004

Related U.S. Application Data

(63) Continuation-in-part of application No. 10/220,550, filed as application No. PCT/US01/08710 on Mar. 16, 2001, said application No. 10/609,818 is a continuation-in-part of application No. 10/220,419, filed as application No. PCT/US01/08711 on Mar. 16, 2001, now Pat. No. 7,243,130.

(60) Provisional application No. 60/189,801, filed on Mar. 16, 2000.

(51) Int. Cl.
*G06F 15/16* (2006.01)
(52) U.S. Cl. ..................................................... 709/206
(58) Field of Classification Search ................... 709/206
See application file for complete search history.

(56) References Cited

U.S. PATENT DOCUMENTS 5,377,354 A 12/1994 Scannell et al.

(Continued)

FOREIGN PATENT DOCUMENTS

EP 0413537 A2 2/1991

(Continued)

OTHER PUBLICATIONS

Jeftovic, Mark. "filter.plx", Feb. 1998. Version 1.02d. Description from the Apache Software Foundation (<http://spamassassin.apache.org/prehistory/>) accessed Feb. 15, 2007.*

(Continued)

*Primary Examiner*—Andrew Caldwell
*Assistant Examiner*—Christopher Biagini
(74) *Attorney, Agent, or Firm*—Lee & Hayes, PLLC

(57) ABSTRACT

The present invention relates to a system and method to facilitate efficient and automated processing of messages. A bulk filter is provided to categorize one or more received messages according to a range of classification, the range spanning from at least a bulk classification of values to at least a non-bulk classification of values. A second filter is provided to further classify the received messages in order to automatically facilitate processing of the messages. The range of classification includes a continuum of values based on a likelihood that the received messages are determined to tend toward or fall within the bulk classification of values or toward/within the non-bulk classification of values. Also, the bulk filter or filters can include an adjustable threshold setting to determine or define differences between the bulk classifications and the non-bulk classifications. Various combinations of filters are possible including multiple filter arrangements, parallel arrangements, cascaded arrangements, and other arrangements to facilitate filtering and sorting of messages in order that users can more efficiently process such information in a timely manner. Applications include the enhancement of classification procedures for identifying urgent or important email from non-urgent or non-important email, with the combination of bulk-email filters with urgency or importance filters in cascaded and parallel filtering methodologies.

22 Claims, 15 Drawing Sheets

U.S. PATENT DOCUMENTS

| | | | |
|---|---|---|---|
| 5,493,692 A | 2/1996 | Theimer et al. | |
| 5,508,817 A | 4/1996 | Kunigami | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,757,916 A | 5/1998 | MacDoran et al. | |
| 5,767,852 A | 6/1998 | Keller et al. | |
| 5,812,865 A | 9/1998 | Theimer et al. | |
| 5,831,545 A | 11/1998 | Murray et al. | |
| 5,928,330 A | 7/1999 | Goetz et al. | |
| 6,023,723 A * | 2/2000 | McCormick et al. | 706/206 |
| 6,161,130 A * | 12/2000 | Horvitz et al. | 709/206 |
| 6,351,764 B1 * | 2/2002 | Voticky et al. | 709/207 |
| 6,370,526 B1 * | 4/2002 | Agrawal et al. | 707/5 |
| 6,442,589 B1 * | 8/2002 | Takahashi et al. | 709/203 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,757,830 B1 * | 6/2004 | Tarbotton et al. | 713/188 |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0174185 A1 | 11/2002 | Rawat et al. | |
| 2003/0023690 A1 * | 1/2003 | Lohtia | 709/206 |
| 2003/0046401 A1 | 3/2003 | Abbott et al. | |
| 2003/0154476 A1 | 8/2003 | Abbott, III et al. | |
| 2005/0034078 A1 | 2/2005 | Abbott et al. | |

FOREIGN PATENT DOCUMENTS

| | | |
|---|---|---|
| EP | 0420779 A3 | 4/1991 |
| EP | 0867823 A2 | 9/1998 |
| EP | 0905633 A2 | 3/1999 |
| EP | 0905633 A3 | 7/2000 |
| GB | 2328110 A | 2/1999 |
| JP | 08314827 A | 11/1996 |
| JP | 10079756 A | 8/1998 |
| WO | WO96/35994 | 11/1996 |
| WO | WO97/38382 | 10/1997 |
| WO | 9800787 | 1/1998 |
| WO | WO98/37680 | 8/1998 |
| WO | WO98/47268 | 10/1998 |
| WO | WO98/58321 | 12/1998 |
| WO | WO99/06915 | 2/1999 |
| WO | WO99/41720 | 8/1999 |
| WO | WO99/67731 | 12/1999 |
| WO | WO 00/49776 A | 8/2000 |
| WO | WO 01/13576 A | 2/2001 |
| WO | WO 01/84764 A | 11/2001 |
| WO | WO 03/048960 A | 6/2003 |

OTHER PUBLICATIONS

Horvitz, Eric; Andy Jacobs; and David Hovel. "Attention-Sensitive Alerting". Proceedings of UAI '99, Conference on Uncertainty and Artificial Intelligence, Jul. 1999.*

Graham-Cumming et al. "Project of the Month, May 2003: POPFile." Sourceforge.net, May 2003: <http://sourceforge.net/potm-2003-05.php>. pp. 1-9.*

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994. pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, pp. 94-104, vol. 265—No. 3.

Chien-Liang Liu, et al. The Design of Anti-SPAM Knowledge-Based System. Apricot 2003 Conference. Online, http://scholar.google.com/scholar?hl=en&lr=&q=spam+filter+%22White+list%22&btnG=Search, retrieved on Feb. 9, 2005. Feb. 2003. pp. 1-18.

Costas Tsatsoulis, Qing Cheng and Hsin-Yen Wei, "Integrating Case-Based Reasoning and Decision Theory", 1997, 10 pages.

Francis Chu and Joseph Halpern, "A Decision-Theoretic Approach to Reliable Message Delivery", 15 pages.

Peter Haddawy, "An Overview of Some Recent Developments in Bayesian Problem-Solving Techniques Introduction to This Special Issue", 1999, 9 pages.

Finn V. Jensen, "Bayesian networks basics", Winter 1995/ Spring 1996, 14 pages.

Yu Lo Cyrus Chang, Leslie C. Lander, Horng-Shing Lu and Martin T. Wells, "Bayesian Analysis for Fault Location in Homogeneous Distributed Systems", 1993, 10 pages.

Sanguk Noh and Piotr J. Gmytrasiewicz, "Rational Communicative Behavior in Anti-Air Defense", 1998, 8 pages.

Alec Cameron and Hsiang-Lung Wu, "Identifying and Localizing Electrical Components: A Case Study of Adaptive Goal-directed Sensing", 1997, 6 pages.

Nitin Sawhney and Chris Schmandt, Speaking and Listening on the Run: Design for Wearable Audio Computing, 1998, 8 pages.

Doree Duncan Sehgmann, Cati Laporte, and Stephan Vladimir Bugaj, "The message is the medium", 1997, 12 pages.

Juha Takkinen and Nahid Shahmehri, "Cafe: A Conceptual Model for Managing Information in Electronic Mail", 1998, 10 pages.

Jacob Palme, Jussi Karlgren, and Daniel Pargran, "Issues whe designing filters in messaging systems", 1996, 7 pages.

Chaomei Chen, "Visualising semantic spaces and author co-citation networks in digital libraries", 1999, 20 pages.

International Search Report dated Aug. 20, 2002, for International Application Serial No. PCT/US01/08711.

International Search Report dated Sep. 2, 2002, for International Application Serial No. PCT/US01/08710.

Robert M. Losee Jr., "Minimizing information overload: the ranking of electronic messages", 1989, 11 pages.

Paul E. Baclace, "Competitive Agents for Information Filtering", Dec. 1999, 1 page.

Makoto Iwayama and Takenobu Tokunaga, "Hierarchical Bayesian Clustering for Automatic Text Classification", 1995, 6 pages.

William W. Cohen, "Learning Rules that Classify E-Mail", 1996, 11 pages.

Gary Boone, Concept Features in Re: Agent, an Intelligent Email Agent, 1998, 8 pages.

Marti A. Hearst and Haym Hirsh, "Machine Learning in Information Access Papers from the 1996 AAAI Spring Symposium", 1996, 3 pages.

Jonathan Isaac Helfman and Charles Lee Isbell, "Ishmail: Immedieate Identification of Important Information", 8 pages.

M. Marx, et al, "Clues: Dynamic Personalized Message Filtering", Preceedings of the ACM 1996 Conference on Computer Supportedcooperative Work, Boston, Nov. 16-20, 1996, pp. 113-121.

* cited by examiner

USE OF A BULK-EMAIL FILTER WITHIN A SYSTEM FOR CLASSIFYING MESSAGES FOR URGENCY OR IMPORTANCE

REFERENCE TO RELATED APPLICATIONS

This application is a continuation in part of U.S. patent application Ser. No. 10/220,550 filed on Aug. 30, 2002, entitled PRIORITIES GENERATION AND MANAGEMENT, which claims priority to PCT Application Ser. No. PCT/US01/08710, filed on Mar. 16, 2001, which claims the benefit of U.S. Provisional Patent Application Ser. No. 60/189,801, filed on Mar. 16, 2000, entitled ATTENTIONAL SYSTEMS AND INTERFACES.

This application is also a continuation in part of U.S. patent application Ser. No. 10/220,419 filed on Aug. 30, 2002 now U.S. Pat. No. 7,243,130, entitled NOTIFICATION PLATFORM ARCHITECTURE, which claims priority to PCT Application Ser. No. PCT/US01/08711, filed on Mar. 16, 2001, which claims the benefit of U.S. Provisional Patent Application Ser. No. 60/189,801, filed on Mar. 16, 2000, entitled ATTENTIONAL SYSTEMS AND INTERFACES. All of the aforementioned applications are incorporated herein by reference.

TECHNICAL FIELD

The present invention relates generally to systems and methods that facilitate communications between devices, systems, processes, and/or individuals. More particularly, the present invention relates to the employment of multilevel filters for managing received messages.

BACKGROUND OF THE INVENTION

With the growth of computer and information systems, and related network technologies such as wireless and Internet communications, ever increasing amounts of electronic information are communicated, transferred and subsequently processed by users and/or systems. As an example, electronic mail programs have become a popular application among computer users for generating and receiving such information. With the advent of the Internet, for example, exchanging e-mail or other information such as voice or audio information has become an important factor influencing why many people acquire computers. Within many corporate environments, e-mail, for example, has become almost a de facto standard by which coworkers exchange information. However, with the heightened popularity of e-mail and other information transfer systems, problems have begun to appear in regard to managing and processing increasing amounts of information from a plurality of sources.

Among these problems, many users now face a deluge of e-mail and/or other information from which to sort through and/or respond, such that the capability of being able to send, receive and process information has almost become a hindrance to being productive. With such large numbers of e-mail and/or other electronic information, it has thus become difficult to manage information according to what is important and what is not as important without substantially expending valuable time to make a personal determination as to the importance. As an example of these determinations, users may have to decide whether messages should be responded to immediately, passed over to be read at a later time, or simply deleted due to non-importance (e.g., junk mail).

Some attempts have been directed to information management problems. For example, attempts have been made to curtail the amount of junk or promotional e-mail that users receive. Additionally, some electronic mail programs provide for the generation of rules that govern how e-mail is managed within the program. For example, a rule providing, "all e-mails from certain coworkers or addresses" are to be placed in a special folder.

These attempts at limiting certain types of information, however, generally are not directed at the basic problem behind e-mail and other information transfer/reception systems. That is, conventional systems often cause users to manually peruse and check at least a portion of some if not all of their received messages in order to determine which messages should be reviewed or further processed. As described above, this takes time from more productive activities. Thus, with the large quantities of information being received, there is a need for a system and methodology to facilitate efficient processing of electronic information while mitigating the costs of manual interventions associated therewith.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for assigning urgency or importance scores as well as bulk scores to one or more communications items or messages (e.g., e-mail, voice encoded text). Respective items or messages are then sorted and/or filtered according to the assigned scores in order to facilitate message processing by users. The subject invention provides for a multi-level cascade and/or parallel combinations with respect to sorting or filtering messages/items. By pre-filtering items vis a vis the classification of the likelihood that the email is bulk email, removing junk items and subsequently performing prioritization of items remaining after going through a bulk pre-filter and/or junk pre-filter, a priority-based system can be substantially optimized.

Single-level urgency or importance classifiers can be composed to identify bulk email messages as having low urgency and/or importance, by including bulk email in the low urgency or low importance category in the training set used to build a statistical classifier. However, training a message urgency or importance filter with bulk email included in the low-urgency or low-importance category can diminish the filters ability to ideally distinguish urgent from non-urgent email. For example, bulk email can contain properties associated with important or urgent messages. To enhance the power of urgency classifiers, a separate bulk email filter can be constructed to infer the likelihood that email is bulk email, and thus remove the email from consideration of an urgency or importance filter, raising the accuracy of the urgency or importance classification, by reducing false positives and false negatives in the importance or urgency classifier. Another aspect of the invention provides for authenticating internal e-mail or other type messages (which corresponds with non-junk) and bypassing the bulk pre-filter—thus internal messages will be automatically prioritized (e.g., not pass through the bulk pre-filter).

Various combinations of filters are provided in accordance with the present invention for automatically managing user messages. In one aspect, a bulk filter and an urgency filter process received messages in parallel. Output from respective filters includes scoring of the received messages according to the likelihood the messages are of the bulk variety (e.g., mass sales literature) or non-bulk variety and the urgency of the received messages. Policies can be provided to enable sorting of the messages according to the assigned scores. In one aspect, bulk e-mail may be sorted into a special file or folder, wherein non-bulk messages are sorted according to urgency, priority, and/or a utility model that categorizes messages according to an expected cost of delayed review for urgent and non-urgent messages. In another aspect, an urgency filter computes an expected urgency score for bulk and non-bulk messages. A bulk filter then computes a bulk score for the urgency scored messages and performs a re-weighting process by considering the likelihood that a given message is bulk given the bulk score.

In yet another aspect, a bulk filter may be applied to incoming messages wherein output from the bulk filter is then processed by an urgency filter providing a cascaded filter arrangement. With such an approach the urgency or importance filter can be employed to infer the likelihood of urgency or importance, conditioned on the email not being bulk email, p(urgency|not bulk email). As can be appreciated filters can be arranged in many orders and combinations. This includes employment of filter bypass mechanisms for messages deemed of a certain type (e.g., internal versus external). Other type filtering arrangements include analyzing a message's importance then processing the analyzed messages according to an urgency determination. Other applications include considering the loss of value over time on messages that have been categorized to varying degrees of urgency.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and method to facilitate efficient and automated processing of messages. A bulk filter is provided to categorize one or more received messages according to a range of classification, the range spanning from at least a bulk classification of values to at least a non-bulk classification of values. A second filter such as an urgency or importance filter, hereafter referred to as an urgency filter, is provided to further classify the received messages in order to automatically facilitate processing of the messages. The range of classification includes a continuum of values based on a likelihood that the received messages are determined to tend toward of fall within the bulk classification of values or toward/within the non-bulk classification of values. Also, the bulk filter (or filters) can include an adjustable threshold setting to determine or define differences between the bulk classifications and the non-bulk classifications. Various combinations of filters are possible including multiple filter arrangements, parallel arrangements, cascaded arrangements, and other arrangements to facilitate filtering and sorting of messages in order that users can more efficiently process such information in a timely manner.

As used in this application, the terms "component," "filter," "model," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
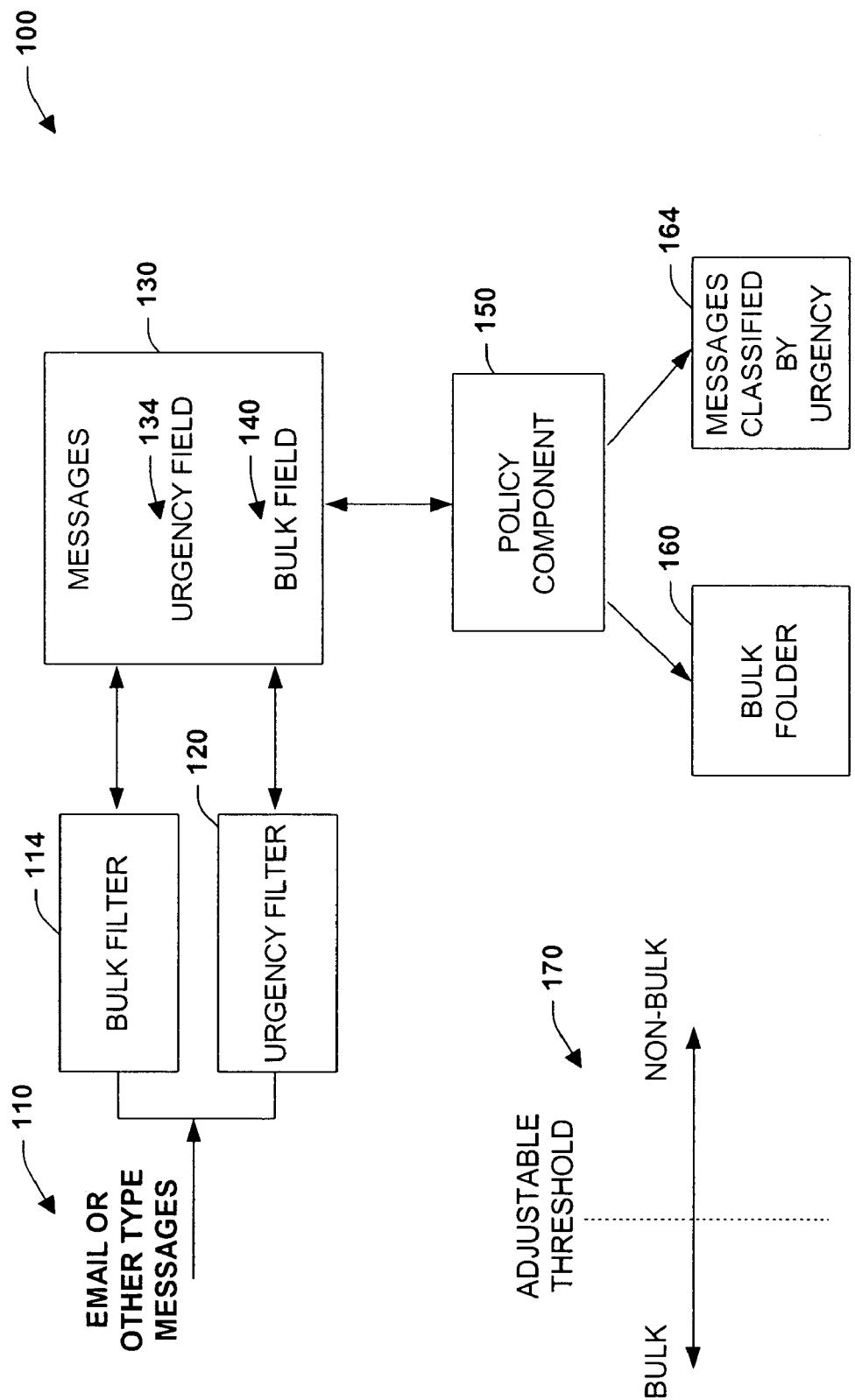
FIG. 1 is a schematic block diagram illustrating bulk filtering in accordance with an aspect of the present invention.

Referring initially to FIG. 1, a system 100 illustrates a bulk filter for message processing in accordance with an aspect of the present invention. In light of the growing problem of bulk email, the present invention provides a multi-level filter approach to enhancing the classification of the urgency of email. It is noted however, that although the following discussion describes email processing, that the present invention can be applied to substantially any type of electronic message processing. For example, voice messages may be automatically encoded into text, wherein subsequent processing of the text can occur similarly to email. Also, various combinations of multi-level filtering (e.g., parallel and/or serial combinations) are possible as described in the following figures and discussion.

In one approach as illustrated by the system 100, at least two filters are employed to process emails 110 (or other type messages). A bulk email filter or classifier 114 is employed for discriminating between bulk email and non-bulk email. An urgency filter 120 is employed to assign email urgency scores, with or without the use of a utility model described below that assigns an expected cost of delayed review for urgent versus non-urgent email. In this aspect of the present invention, the filters 114 and 120 examine new email 110 and annotate the email 130 with an urgency value, represented in an urgency field 134, and a likelihood of bulk email, represented in a bulk email field at 140, a policy component 150 includes policies or rules for considering inferences relating to message urgency and/or bulk considerations.

In one aspect of a two filter system, rules or policies are employed by the policy component 150 to siphon away or remove bulk email of a higher than threshold (per a user's adjustable settings or preferences) likelihood of being bulk email into a special folder for later review depicted as a bulk folder 160. Remaining email is classified by urgency in another folder 164. At reference numeral 170, a diagram illustrates a range of values that may be determined for bulk computations and non-bulk computations. When bulk determinations are made by the bulk filter 114, statistical determinations are provided that compute a probability or likelihood that a respective email is of the bulk or non-bulk type. For example, one e-mail may have a 70% likelihood of being a bulk mailing, whereas another email may be determined as having a 62% likelihood of being considered bulk. As illustrated, an adjustable threshold (e.g., user interface sliders adjusting a probability value) may be employed by users to set the level when emails should be considered as bulk (e.g., all emails with a determined likelihood below 0.50 of being bulk are to be treated as non-bulk e-mails).

Figure 2:
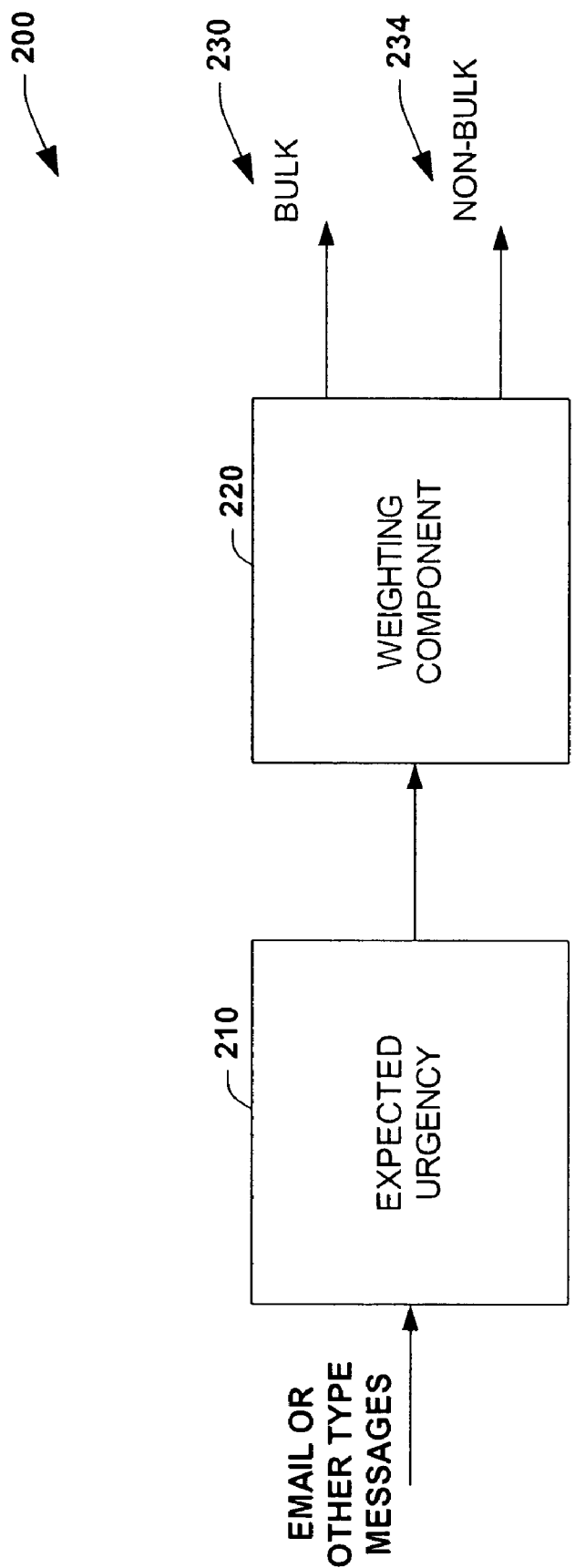
FIG. 2 is a diagram an expected urgency determination in accordance with an aspect of the present invention.

Referring now to FIG. 2, a system 200 is illustrated for performing bulk computations in accordance with an aspect of the present invention. In this aspect, an expected urgency is computed at 210 for emails followed by a weighting component 220 to determine whether a respective message is of the bulk or non-bulk variety at 230 and 234, respectively. An expected urgency score is computed at 210, by considering the likelihood that email is bulk email, within the expected urgency scores. In this case, urgency is computed as a function, $f(p(\text{urgent}|E1 \ldots En), p(\text{bulk email}|E1 \ldots En))$, wherein $f$ is a function, p is a probability, and E is evidence relating to urgency or whether an email is bulk.

As an example, if it assumed that the urgency filter described above treats bulk email and normal email in a similar manner, per assignments of urgency (i.e., that urgency score is independent of whether or not the email is bulk email), then the expected urgency of email can be computed by performing an urgency analysis, and then re-weighting it at 220 by considering the likelihood that the email is bulk email.

Generally, the urgency of bulk email is considered to be zero (or other low value). Thus, from an urgency analysis, for (in this example) a binary classification of urgency into urgent and non-urgent email, then, before bulk email analysis an expected urgency can be determined as:

$$\text{Expected urgency} = p(\text{urgent}| E1 \ldots En)(\text{Cost of delayed review} \\ (\text{Urgent email})) + (1 - p(\text{urgent}|E1 \ldots En)) \\ (\text{Cost of delayed review (Non-urgent email)})$$

Folding in a bulk email analysis:

$$= 1 - p(\text{bulk email}| E1 \ldots En) \times \\ [p(\text{urgent}| E1 \ldots En)(\text{Cost of delayed review} \\ (\text{Urgent email})) + (1 - p(\text{urgent}|E1 \ldots En)) \\ (\text{Cost of delayed review (Non-urgent email)})]$$

That is, an expected urgency score can be computed from an urgency classifier (and a utility model) described below, and then determine the expectation considering that re-weighting it by considering the likelihood that the message is bulk email, considering the bulk email score. The following discussions consider the probabilistic dependencies between junk filter analysis and bulk filter analysis.

Figure 3:
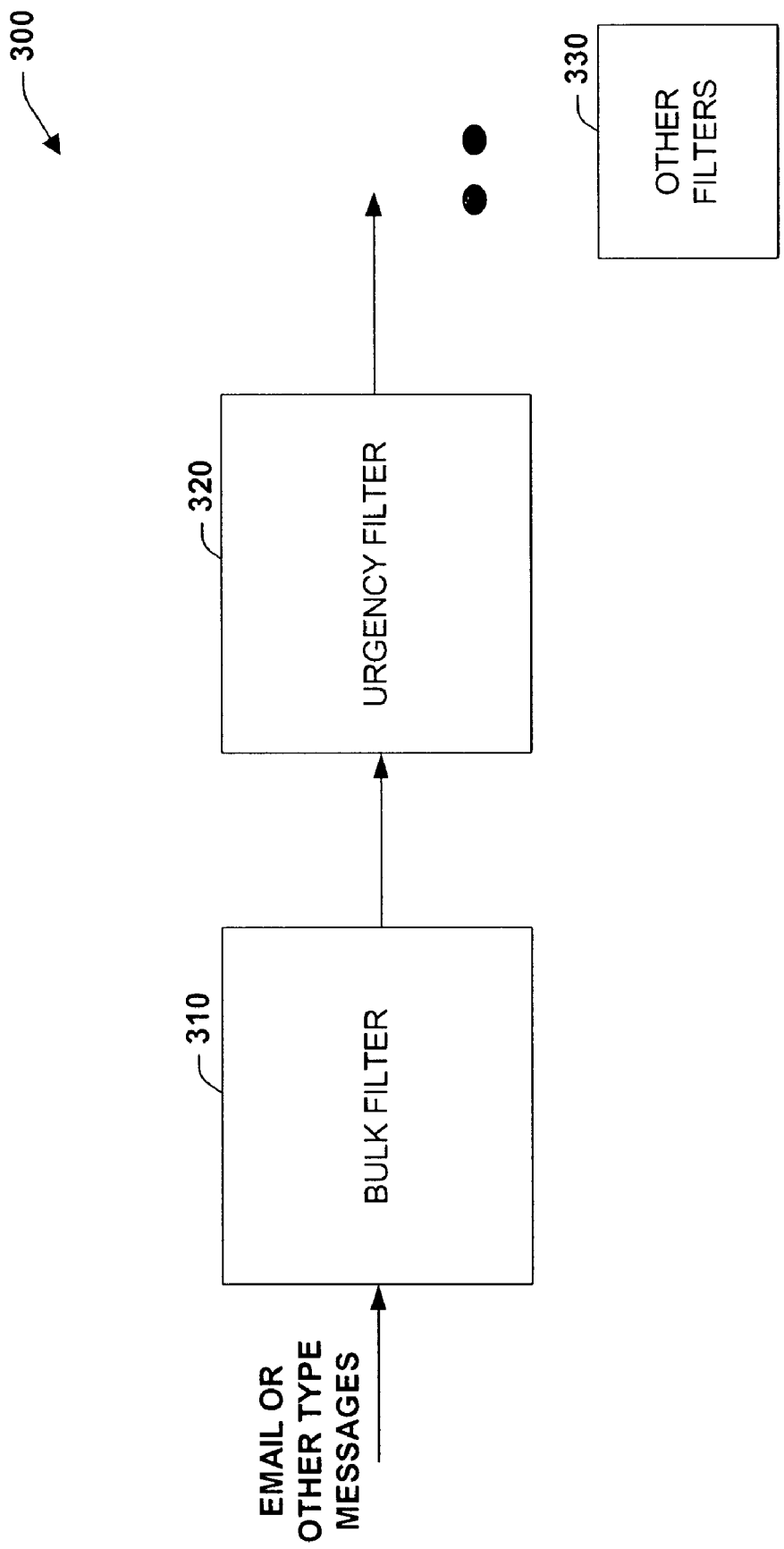
FIG. 3 is a diagram illustrating cascaded filtering in accordance with an aspect of the present invention.

Turning to FIG. 3, a system 300 illustrates cascaded filters in accordance with an aspect of the present invention. In this aspect, a bulk filter 310 computes bulk score (e.g., probability), or discretized states of that score, as a direct input to an urgency filter 320. A classifier, for example, can be constructed that takes into consideration the bulk score. To achieve this, the bulk filter 310 is initially constructed, and then the urgency filter 320 is later trained constructed employing output from the bulk filter. This type approach is referred to as a cascade of filters. As can be appreciated, other filters illustrated at 330 can be similarly added to the cascade.

Figure 4:
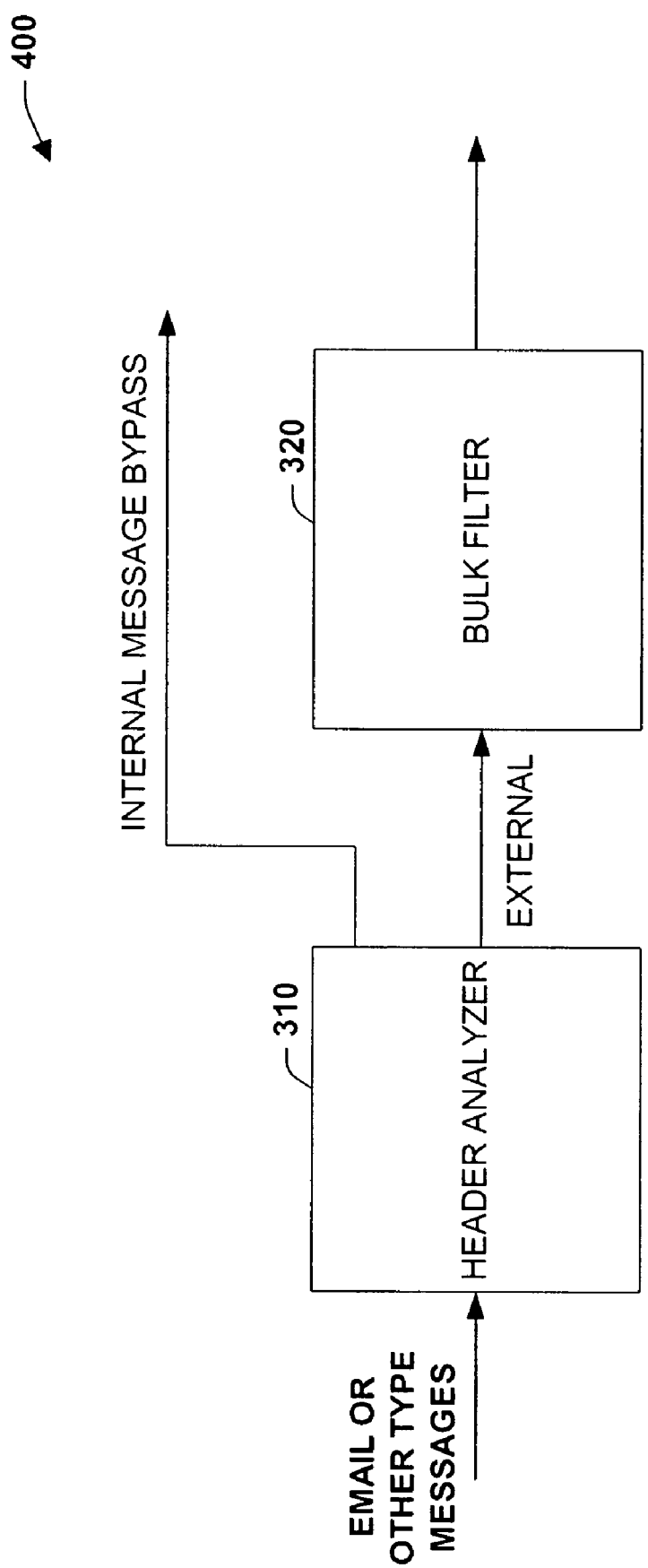
FIG. 4 is a diagram illustrating a filter bypass system in accordance with an aspect of the present invention.

Referring now to FIG. 4, a system 400 illustrates message bypassing in accordance with an aspect of the present invention. In this aspect, a header analyzer 410 automatically removes consideration of some email from a bulk filter 420, as the filter can have some finite false positive rate. By analysis of the header of email or other type messages, email can be identified as being generated internally -that is, within an organization, for example. Internal messages are specially marked or flagged as being immune to the bulk-email filter 420, thus, bypassing this filter.

Figure 5:
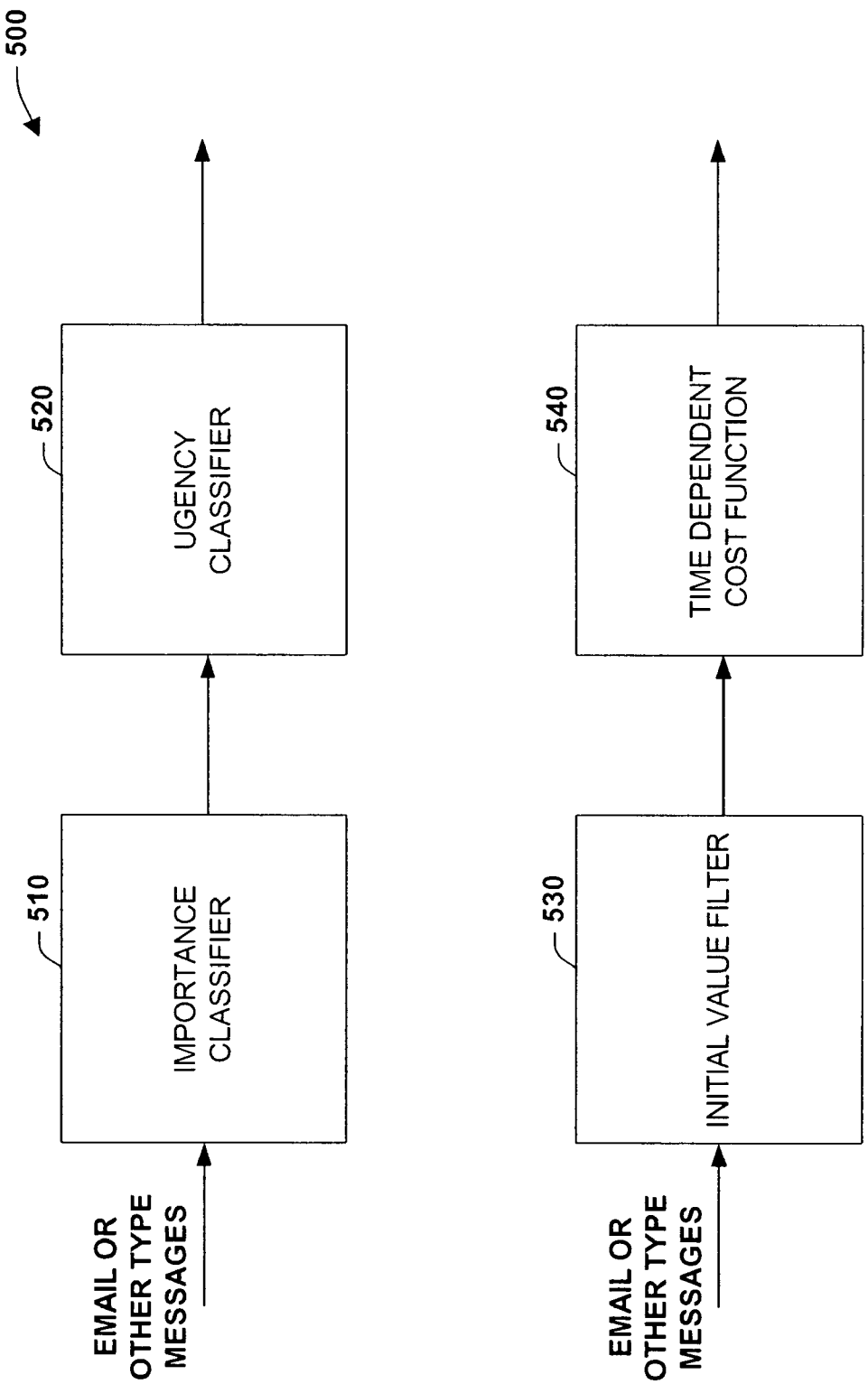
FIG. 5 illustrates alternative filter applications in accordance with an aspect of the present invention.

FIG. 5 illustrates alternative aspects of the present invention. In this aspect, multiple filters and/or filter cascades are employed to separately identify important email (email that is important to see, but that is not time-critical) from urgent or time-critical messages. Thus, at 510, classifiers for importance are constructed, and then a second (or other) layers of classifiers at 520 are utilized to compute the urgency of messages given different importance values. In another application of multiple filters, filters can be developed at 530 that provide an initial value of a message, versus those messages that yield the loss of value over time. This allows building time-dependent cost functions at 540 that capture the initial value from 530 and determine loss of the initial value with time for respective messages at 540.

It is noted that various combinations of parallel or cascaded filters can also be employed to classify separately importance and urgency, wherein one filter classifies messages by importance and the second analyzes messages for urgency. Thus, for example, in a cascade of filters, bulk email versus non-bulk can be sorted as previously described, then importance of non-bulk messages is determined via an importance filter to provide further sorting, then urgency of important messages is determined via an urgency filter.

Figure 6:
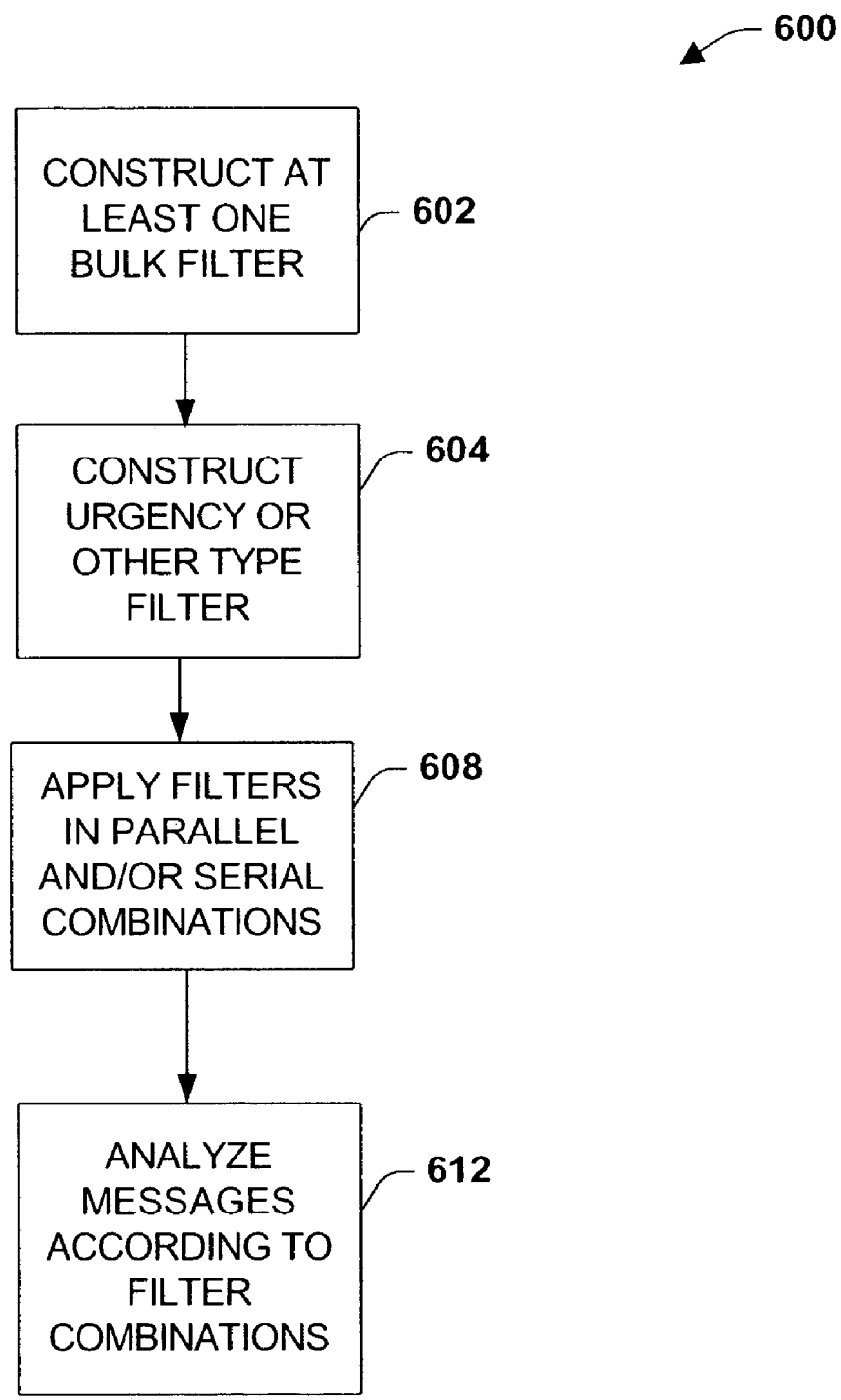
FIG. 6 is a flow diagram illustrating message processing in accordance with an aspect of the present invention.

FIG. 6 illustrates a methodology for providing filtering and message processing in accordance the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 602, at least one bulk filter is constructed for processing incoming messages such as email or other type messages. At 604, at least one other type of filter is constructed that cooperates with the bulk filter constructed at 604. Such filters include urgency filters, importance filters, time critical filters, and/or weighted filters for example. At 608, the filters constructed at 602 and 604 are applied to incoming messages in various combinations. This can include parallel combinations of filters, serial combinations, and/or combinations having some serial elements and some parallel elements. At 612, messages are automatically analyzed and filtered according to desired combinations configured at 608. This can include dynamic sorting operations, wherein messages deemed to be of the bulk variety are sorted out into a separate folder, whereas other messages are prioritized in an inbox, for example. Other aspects include enabling users to set thresholds that set likelihood limits for when an item is considered bulk. If an item scores above the threshold for example, indicating that a message has been determined to be bulk, then the respective bulk email can be deleted, removed, and/or sorted.

Figure 7:
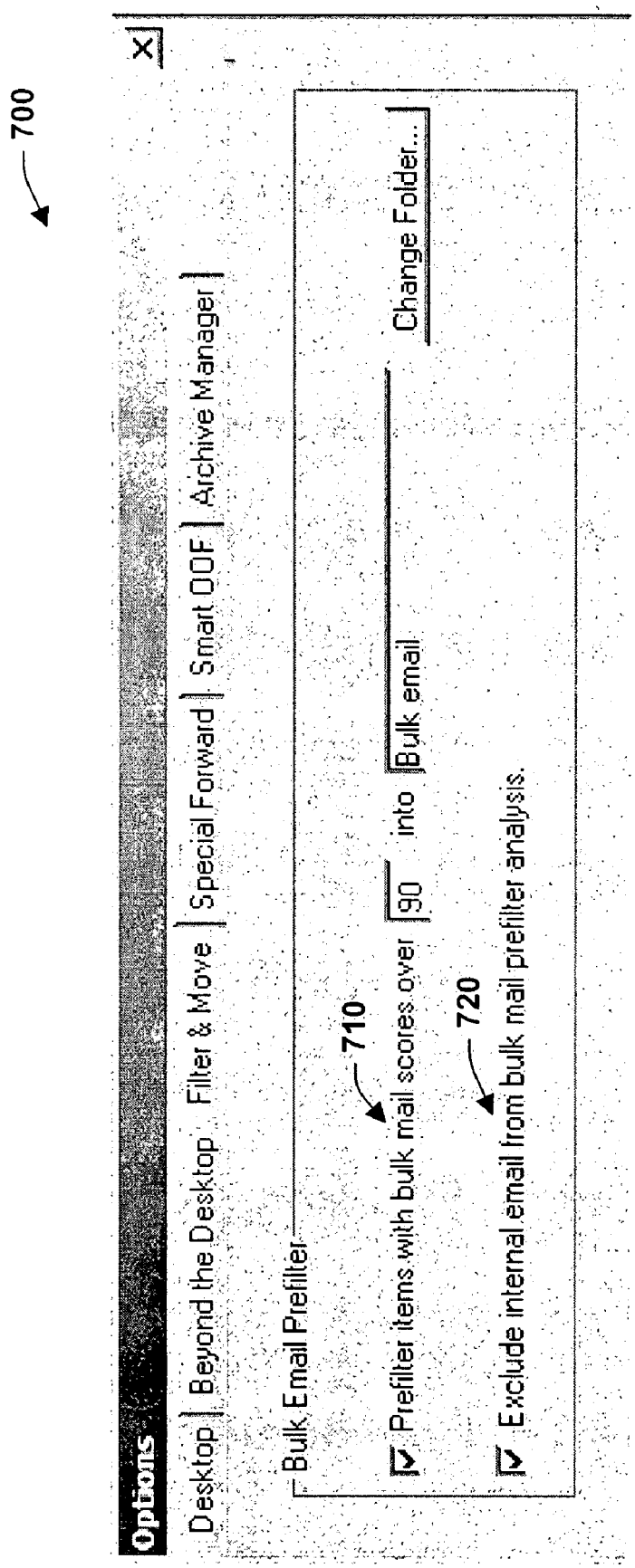
FIG. 7 is a user interface illustrating filter options in accordance with an aspect of the present invention.

FIG. 7 is a user interface 700 depicting filter settings in accordance with an aspect of the present invention. At 710, a selection is provided to enable users to filter items having a bulk score over a settable value (e.g., for items having a bulk score over 90, sort these items into a bulk email folder). At 720, a bypass selection option is provided. For example, if an email is determined to be of an internal type, exclude such emails from a bulk filter analysis. These controls allow for separate sifting and filtering out bulk email, prior to urgency analysis and/or allow excluding certain items marked as internal, for example, from being exposed to bulk filter analysis.

Figure 8:
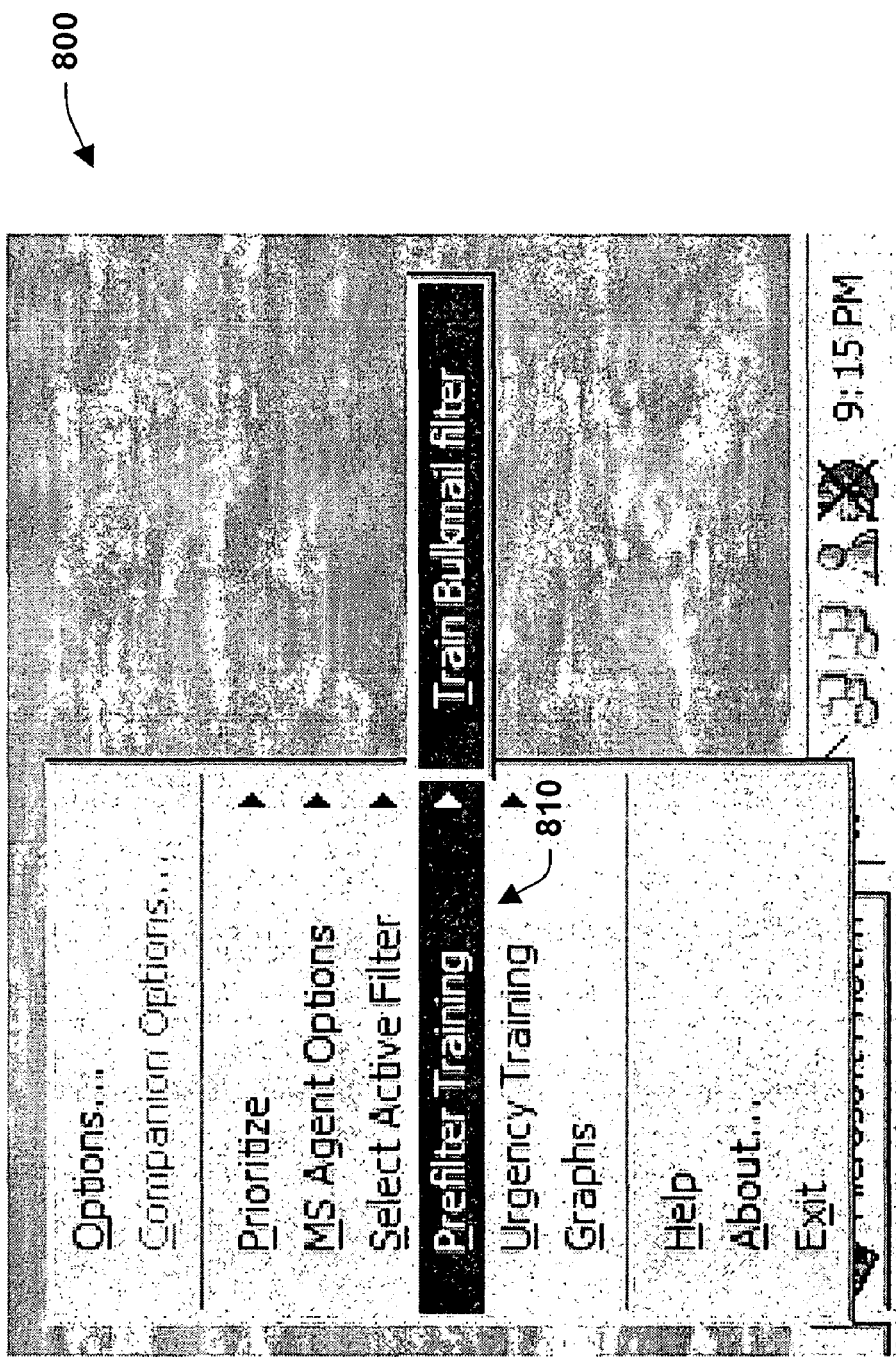
FIG. 8 is a user interface illustrating training options in accordance with an aspect of the present invention.

FIG. 8 is a user interface 800 depicting filter settings in accordance with an aspect of the present invention. The interface 800 includes various selections for configuring filters. At 810, a selection is provided to enable users to train a bulk filter (e.g., observe these selected bulk items to learn how to distinguish bulk items). Other options include, urgency training, graph options, active filter selections, agent options, and prioritization options.

Figure 9:
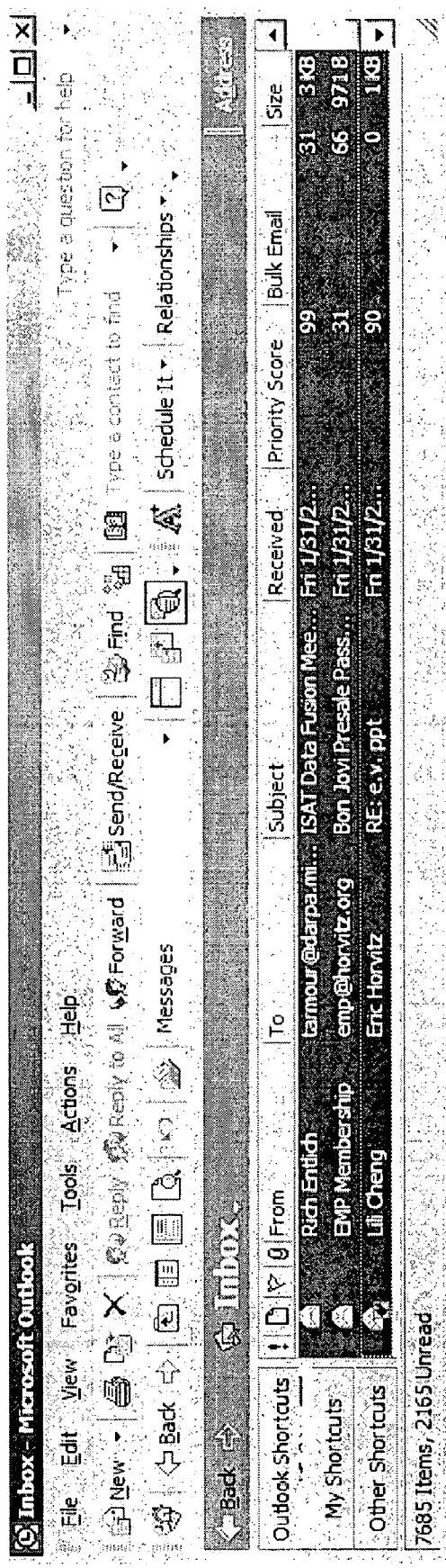
FIG. 9 is a user interface illustrating message sorting and annotation in accordance with an aspect of the present invention.

FIG. 9 is a user interface 900 depicting priority score and bulk email fields in accordance with an aspect of the present invention. As noted above, Priority score is generally derived from p(urgent email|E1 ... En), whereas Bulk score is derived from p(bulk email|E1 ... En). Three sample annotated messages are displayed in the interface 800 although other messages can be similarly processed.

p(bulk email|E1 ... En)=0.31 and p(urgent|not junk)=0.99

At 820, p(bulk email|E1 ... En)=0.66 and p(urgent|not junk)=0.31

Figure 10:
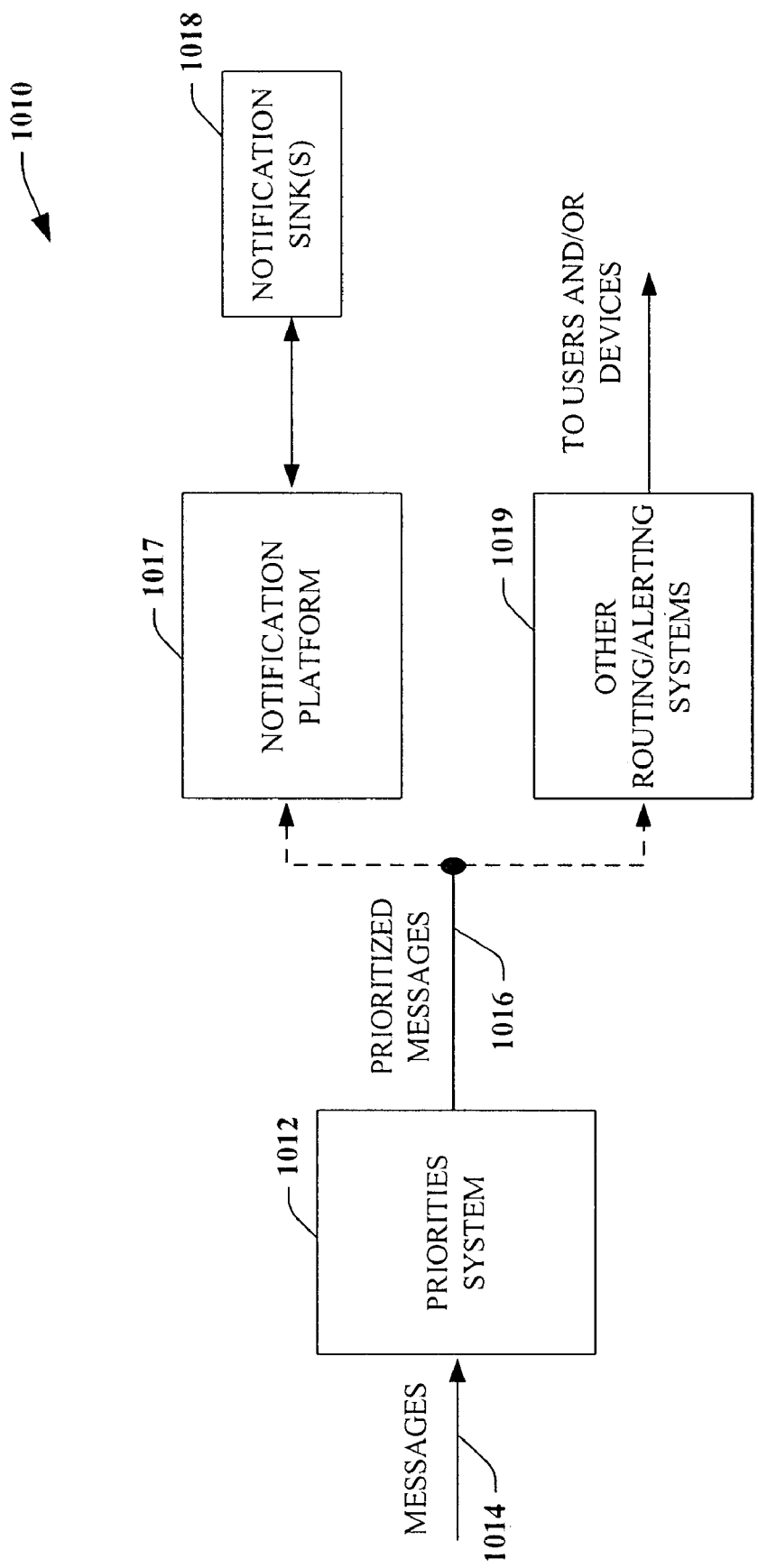
FIG. 10 is a schematic diagram illustrating a priorities system in accordance with an aspect of the present invention.

At 830 p(bulk email|E1 ... En)=0.00 and p(urgent|not junk)=0.90. Note, these scores can be employed separately, or can be built as a composite score. Referring to FIG. 10, a system 1010 illustrates a priorities system 1012 and notification architecture in accordance with an aspect of the present invention. The priorities system 1012 receives one or more messages or notifications 1014, generates a priority or measure of importance (e.g., probability value that the message is of a high or low importance) for the associated message, and provides the one or more messages with an associated priority value at an output 1016. As will be described in more detail below, classifiers can be constructed and trained to automatically assign measures of priorities to the messages 1014. For example, the output 1016 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 1017 can be employed in conjunction with the priorities system 1012 to direct prioritized messages to one or more notification sinks accessible to users. As will be described in more detail below, the notification platform 1017 can be adapted to receive the prioritized messages 1016 and make decisions regarding when, where, and how to notify the user, for example. As an example, the notification platform 1017 can determine a communications modality (e.g., current notification sink 1018 of the user such as a cell phone, or Personal Digital Assistant (PDA)) and likely location and/or likely focus of attention of the user. If a high importance e-mail were received, for example, the notification platform 1017 can determine the users location/focus and direct/reformat the message to the notification sink 1018 associated with the user. If a lower priority message 1016 were received, the notification platform 1017 can be configured to leave the e-mail in the user's in-box for later review as desired, for example. As will be described in more detail below, other routing and/or alerting systems 1019 may be utilized to direct prioritized messages 1016 to users and/or other systems.

In the following section of the description, the generation of a priority for electronic files such as an e-mail is described via an automatic classification system and process. The generation of priorities for messages represented electronically as described can then be employed in other systems. The description in this section is provided in conjunction with FIG. 11 and FIG. 12, the former which is a diagram illustrating explicit and implicit training of a classifier, and the latter which is a diagram depicting how a priority for an electronic message is generated by input to the classifier.

Figure 11:
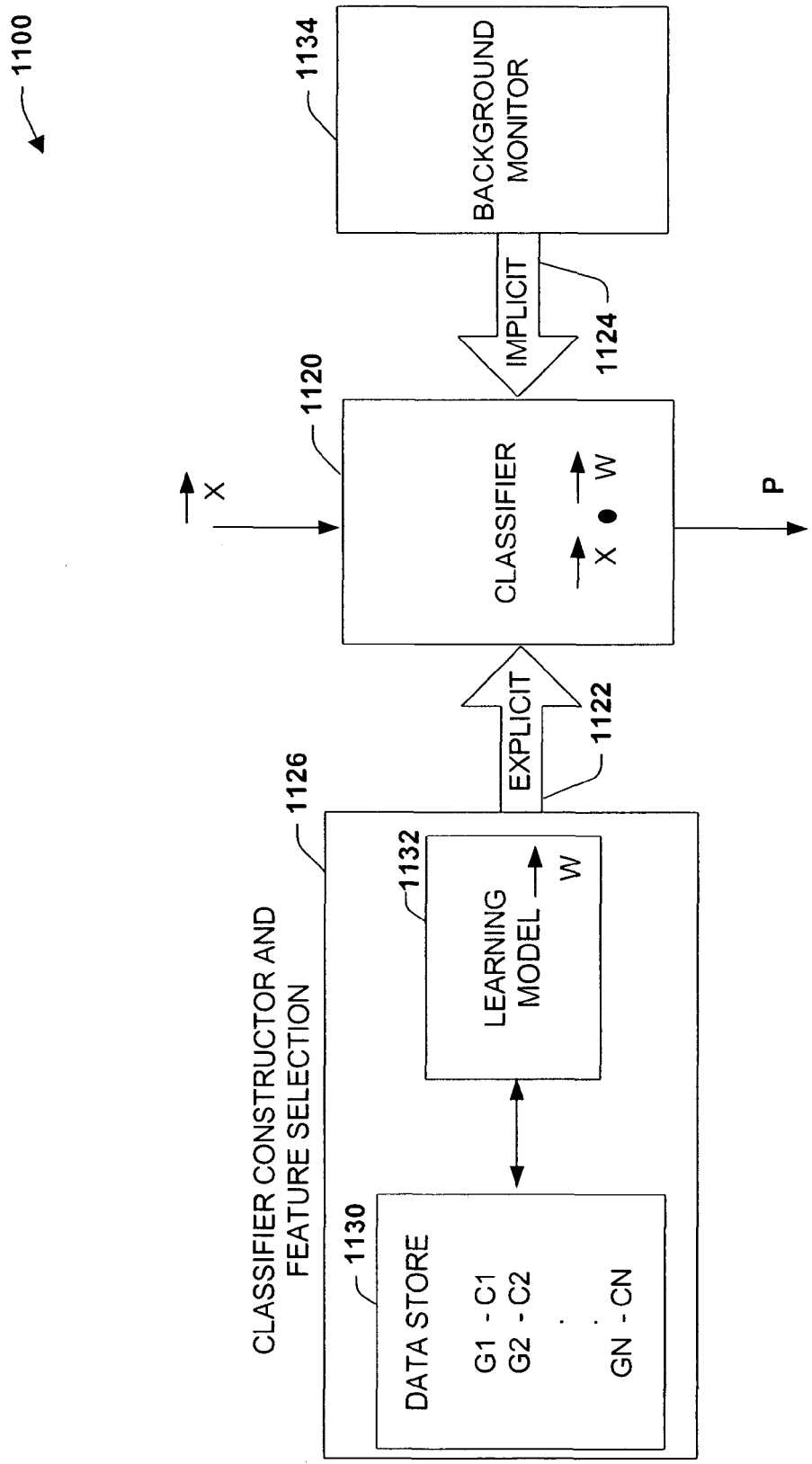
FIG. 11 is a diagram illustrating classifiers in accordance with an aspect of the present invention.

Referring now to FIG. 11, a text/data classifier 1120 can be trained explicitly, as represented by the arrow 1122, and implicitly, as represented by the arrow 1124 to perform classification in terms of priority. Explicit training represented by the arrow 1122 is generally conducted at the initial phases of constructing the classifier 1120, while the implicit training represented by the arrow 1124 is typically conducted after the classifier 1120 has been constructed—to fine tune the classifier 1120, for example, via a background monitor 1134. Specific description is made herein with reference to Support Vector Machines (SVM) classifier, for exemplary purposes of illustrating a classification training and implementation approach. Other classification or diagnostic methods that can be handcrafted and/or learned from data include Bayesian networks, decision trees, and probabilistic classification models providing different patterns of independence may be employed. Classification as used herein also is inclusive of statistical regression that is utilized to develop models of urgency or other measures of priority influencing an alerting and/or routing policy.

Training of the text classifier 1120 as represented by the arrow 1122 includes constructing the classifier in 1126, including utilizing feature selection. In the explicit training phase, the classifier 1120 can be presented with both time-critical and non-time-critical texts, so that the classifier may be able to discriminate between the two, for example. This training set may be provided by the user, or a standard or default training set may be utilized. Given a training corpus, the classifier 1120 first applies feature-selection procedures that attempt to find the most discriminatory features. This process can employ a mutual-information analysis, for example. Feature selection can operate on one or more words or higher-level distinctions made available, such as phrases and parts of speech tagged with natural language processing. That is, the text classifier 1120 can be seeded with specially tagged text to discriminate features of a text that are considered important.

Feature selection for text classification typically performs a search over single words. Beyond the reliance on single words, domain-specific phrases and high-level patterns of features are also made available. Special tokens can also enhance classification. The quality of the learned classifiers for e-mail criticality, for example, can be enhanced by inputting to the feature selection procedures handcrafted features that are identified as being useful for distinguishing among e-mail of different time criticality. Thus, during feature selection, one or more words as well as phrases and symbols that are useful for discriminating among messages of different levels of time criticality are considered.

As the following examples illustrate, tokens and/or patterns of value in identifying the criticality of messages include such distinctions as, and including Boolean combinations of the following:

Information in a Message Header

For example:

To: Field (Recipient Information)
Addressed just to user,
Addressed to a few people including user,
Addressed to an alias with a small number of people,
Addressed to several aliases with a small number of people,
Cc:'d to user,
Bcc:'d to user.

From: Field (Sender Information)
Names on pre-determined list of important people, potentially segmented into a variety of classes of individuals, (e.g., Family members, Friends)
Senders identified as internal to the user's company/organization, Information about the structure of organizational relationships relative to the user drawn from an online organization chart such as:
Managers user reports to,
Managers of the managers of users,
People who report to the user,
External business people.

Past Tense Information
These include descriptions about events that have already occurred such as:
We met, meeting went, happened, got together, took care of, meeting yesterday.

Future-tense Information
Tomorrow, This week, Are you going to, When can we, Looking forward to, Will this, Will be.

Meeting and Coordination Information
Get together, Can you meet, Will get together, Coordinate with, Need to get together, See you, Arrange a meeting, Like to invite, Be around.

Resolved Dates
Future vs. past dates and times indicated from patterns of text to state dates and times explicitly or typical abbreviations such as:
On 5/2, At 12:00.

Periods Until Identified Times
Period of time between message composition or receipt and resolved dates and times.
Computation of the time between a message composition date or receipt date and one or more resolved times and dates being referred to in the message.
e.g., Message composed on Tuesday, March 12 at 10 am containing phrase, "How about getting lunch this afternoon?"
Lunch this afternoon resolved to 12:00 pm
Period of time until resolved date/time=2 hours Questions
Words, phrases adjacent to questions marks (?)

Indications of Personal Requests:
Can you, Are you, Will you, you please, Can you do, Favor to ask, From you.

Indications of Need:
I need, He needs, She needs, I'd like, It would be great, I want, He wants, She wants, Take care of.

Indications of Time Criticality
happening soon, right away, deadline will be, deadline is, as soon as possible, needs this soon, to be done soon, done right away, this soon, by [date], by [time].

Importance
is important, is critical, Word, phrase+!, Explicit priority flag status (low, none, high).

Length of Message
Number of bytes in component of new message.

Salient Signs of Commercial and Adult-Content Junk e-Mail
Free!!, Word+! !!, Under 18, Adult's only, Percent of capitalized words, Percent non-alphanumeric characters.

Beyond keywords and phrases, statistics on parts of speech and logical forms of sentences appearing in the subject and body of messages can also be employed.

Patterns of Pointers
    Pointers to resources external to the email message, such as URLs embedded in mail messages.
    Number and type of pointers to sites outside of a user's organizational domain
    Number and type of pointers to sites within a user's organizational domain.

Background Colors
    Email senders may employ different background patterns than the default white background that is commonly used.

Embedded Graphics
    Number, type, and size of graphics files.
        e.g., files with .jpg, .gif file extensions that are rendered as graphical images HTML and XML
    HTML and XML for rich control of rendering and for execution of scripts may be embedded in email.

General Natural Language Processing Analysis
    Statistics on appearances of parts of speech and logical forms in sentences in a message,
    Identification of various factoid classes,
    Different patterns of presentation, and so forth.

It is noted that the word or phrase groupings depicted above illustrate exemplary words, groupings, or phrases that may be utilized from which to conduct classifier training. It is to be appreciated that other similar words, groups, or phrases may be similarly employed and thus the present invention is not limited to the illustrated examples.

Furthermore, still referring to FIG. 11, implicit training of the classifier 1120, as represented by the arrow 1124, can be conducted by monitoring the user work or usage patterns via the background monitor 1134 that can reside on the user's desktop or mobile computer, for example. For example, as users work, and lists of mail are reviewed, it can be assumed that time-critical messages are read first, and lower-priority messages are reviewed later, and/or deleted. That is, when presented with a new e-mail, the user is monitored to determine whether he or she immediately opens the e-mail, and in what order, deletes the email without opening, and/or replies to the e-mail relatively in a short amount of time. Thus, the classifier 1120 is adapted such that a user is monitored while working or operating a system, the classifier is periodically refined by training in the background and updated for enhancing real-time decision-making. Background techniques for building classifiers can extend from those that update the classifier 1120 with new training messages.

Figure 12:
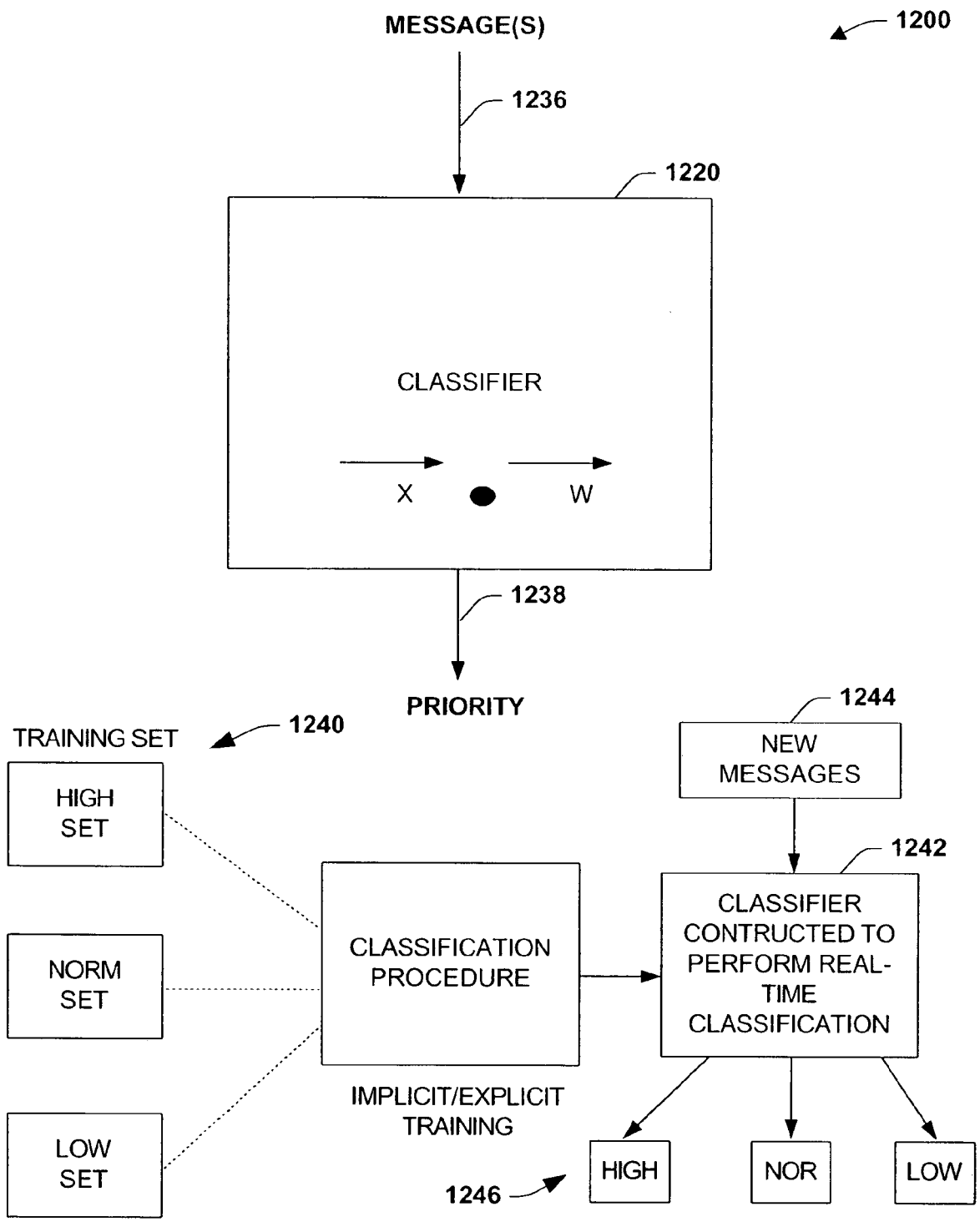
FIG. 12 is a diagram illustrating message classification in accordance with an aspect of the present invention.

Alternatively, larger quantities of messages can be gathered, wherein new filters are created in a batch process, either per a daily schedule, per the number of new quantities of messages admitted to the training set, and/or combinations. For each message inputted into the classifier, for example, a new case for the classifier can be created. The cases are stored as negative and positive examples of texts that are either high or low priority, for example. As an example, one or more low, medium, and high urgency classes can be recognized such that the probabilities of membership in each of these classes are utilized to build an expected criticality. Larger numbers of criticality classes can be utilized to seek higher resolution. For example, as illustrated in FIG. 12, a training set of messages 1240 (e.g., very high, high, medium, normal, low, very low, etc.) can be initially employed to train a classifier 1242, such that real-time classification is achieved, as indicated at 1244, wherein new messages are classified according to the number of examples resolved by the training set 1240. In FIG. 12, three such categories are illustrated for exemplary purposes, however, it is to be appreciated that a plurality of such categories may be trained according to varying degrees of desired importance. As illustrated, the new messages 1244 may be labeled, tagged and/or sorted into one or more folders 1246, for example, according to the priorities assigned by the classifier 1242. As will be described in more detail below, the assigned priorities may further be utilized by subsequent systems to make message format, delivery and modality determinations to/for the user.

According to another aspect of the invention, an estimation of a number or value can be achieved by monitoring a user interact with e-mail, for example, rather than labeling the case or message as one of a set of folders. Thus, a classifier can be continued to be updated but have a moving window, wherein cases of messages or documents that are newer than some age are considered, as specified by the user.

For example, a constant rate of loss associated with the delayed review of messages is referred to as the expected criticality (EC) of the message, wherein, $$EC = \sum_i C^d(H_i) p(H_i | E^d)$$

wherein C is a cost function, d is a delay, E is an event, H is the criticality class of the e-mail, and EC is expressed as the sum over the likelihood of the class(es) weighted by the rate of loss described by the cost function C for the potential class(es).

As an example, referring to FIG. 12, the text, such as an e-mail message, 1236 is input into the classifier 1220, which based thereon generates the priority 1238 for the text 1236. That is, the classifier 1220 generates the priority 1238, measured as a percentage from 0 to 100%, for example. This percentage can be a measure of the likelihood that the text 1236 is of high or some other priority, based on the previous training of the classifier 1220.

It is noted that the present invention as has been described above, the classifier 1220 and the priority 1238 can be based on a scheme wherein the e-mails in the training phase are construed as either high priority or low priority, for example. As described above, a plurality of other training sets may be employed to provide greater or higher resolution distinctions of priorities.

The present invention is not limited to the definition of priority as this term is employed by the classifier to assign such priority to a message such as an e-mail message. Priority can be defined in terms of a loss function, for example. More specifically, priority can be defined in terms of the expected cost in lost opportunities per time delayed in reviewing the message after it has be received. That is, the expected loss or cost that will result for delayed processing of the message. The loss function can further vary according to the type of message received.

It is noted that a criticality "C" which is described in more detail below can be assigned to the cost functions. Thus, "C" generally describes a "cost rate" which refers to the rate at which cost is accrued with delayed review. The "cost functions" are thus defined as the "rate" at which cost is accrued. A total cost, which can be defined as an Expected Loss, "EL" can be defined as:

EL=C*t, wherein the amount of time, t, has transpired between the message being sent and its receipt. If the cost rate is considered to be constant, to the total expected loss rises linearly with increasing amounts of time delay until a message is reviewed. There may typically be uncertainty in the amount of time that will transpire until a message is reviewed by a user, (e.g., based on the user's context now or the expected future context of the user), or, more generally, based upon one or more observations (e.g., the time the user was last seen at a desktop computer, the user's current appointment status in the calendar, and so forth), and/or data about past behavior of the user. Given such uncertainty, the expected loss is computed by summing together the expected losses for each amount of time delay, and weighting the contribution of loss for each potential delay by the probability of seeing that time delay such as:

$$EL' = \sum_j p(t_j | E) \sum_i^n p(critical_i)C(critical_i)t_j$$

wherein EL' is an uncertainty in time of delay, E represents one or more observations about a user state (e.g., a calendar, a room acoustic, a desktop activity, a time since last touched an active device), and i and j are indexes, i and j being integers.

If the cost rate is non-linear, the loss with delayed review can be similarly computed but with integration of the time-dependent rate over time such as:

$$EL' = \sum_j p(t_j | E) \int_0^{t_j} p(critical_i)C(critical_i, t)dt$$

An expected loss can also be computed by adding a term to capture the likelihood of different delays.

For example, some messages, however, do not have their priorities well approximated by the use of a linear cost function. As an example, a message relating to a meeting will have its cost function increase as the time of the meeting nears, and thereafter, the cost function rapidly decreases. That is, after the meeting is missed, there is not much generally a user can do about it. This situation is better approximated by a non-linear cost function, as depicted in FIG. 33. In a graph 2462, a cost function 2464 can be represented as a total cost based on non-linear rates. Thus, the cost function 2464 can be represented as a sigmoid curve with cost starting at about zero and going up nonlinearly, in a monotonic manner, and eventually leveling off. Depending on a message's type, the cost function can be approximated by one of many different representative cost functions, both linear and non-linear as can be appreciated.

Thus, as has been described, the priority of a message can be just the likelihood that it is of one of a plurality of priorities based on the output of a classifier, or the most likely priority class the message applies to, also based on the output of the classifier. Alternatively, an expected time criticality of the message, such as an e-mail message, can be determined. This can be written as:

$$EC = \sum_i^n p(critical_i)C(critical_i)$$

wherein EC is the expected rate of loss, $p(critical_i)$ is the probability that a message has the criticality i, $C(critical_i)$ is the cost function for messages having the criticality i, representing the constant rate of loss of value with delayed review, and n is the total number of criticality classes minus one. In the general case, cost functions may be linear or non-linear, as has been described. In the case where the function is linear, the cost function defines a constant rate of loss with time. For non-linear functions, the rate of loss changes with delayed review or processing of the message and can increase or decrease, depending on the amount of delay.

If there are two criticality classes low and high as an example, the expected loss can be reformulated as:

$$EC=p(critical_{high})C(critical_{high})+[1-p(critical_{high})]C(critical_{low})$$

wherein EC is the expected criticality of a message. Furthermore, if the cost function of low criticality messages is set to zero, this becomes:

$$EC=p(critical_{high})C(critical_{high})$$

For rate of loss that is non-linear with respect to time, an index can be created for the rate of loss by the time of delayed review. In such cases, the total loss until the time of review of a message can be computed and can be expressed as the integration of the time-dependent criticality, or, $$EL=\int_0^t p(critical_{high})C(critical_{high},t)dt$$

wherein t is the time delay before reviewing the document or message.

Other measures that accord a value metric for ranking documents, such as e-mail messages, by importance. While the discussion above focused on priority as time criticality, other notions of "importance" can also be trained. For example, this can be accomplished by labeling a set of training folders: "High Importance" all the way down to "Low Importance" wherein a measure of "expected importance" can be determined. Another metric can be based on a semantic label, "messages that I would wish to hear about within 1 day while traveling" and to determine a measure for prioritizing messages for forwarding to a traveling user. Furthermore, one utilized metric is urgency or time-criticality, as it has clear semantics for decision-making, triage, and routing. In this case, the classes are labeled according to different levels of urgency and computed as an expected urgency for each message from the probabilities inferred that the message is in each class.

Extensions to criticality classification, as described in the previous section, can also be provided in accordance with the present invention. For instance, classification can include an automatic search for combinations of high-payoff features within or between classes of features. As an example, combinations of special distinctions, structures, and so forth, with words that have been found to be particularly useful for certain users can be searched for and utilized in the classification process. A combination of two features is referred as a doublet, whereas a combination of three features is referred to as a triplet, and so forth. The combination of features can enable improved classification. Classification can also be improved with the use of incremental indexing that employs a moving window in the classifier. This enables the classifier to be routinely refreshed, as old data is timed out, and new data is brought in.

Classification can also be based on the determination of the date and time of an event specified in a message. This determination can assign features to the message that can be utilized by the classifier. For example, the features assigned may include: today within four hours, today within eight hours, tomorrow, this week, this month, and next month and beyond. This enables the classifier to have improved accuracy with respect to the messages that are classified. In general, classification can be based on the time of the referenced event, considering whether the event is in the future or has past. With respect to future events, classification thus considers the sender's reference to a time in the future when the event is to occur.

Other new features can also be integrated into the classification process. For example, an organization chart can be utilized to determine how important a message is by the sender's location within the chart. Linguistic features may be integrated into the classifier. To accommodate different languages, the features may be modified depending on the origin of the sender, and/or the language in which the message is written. Classification may vary depending on different folders in which messages are stored, as well as other scaling and control rules. In addition to e-mail and other sources, classification can be performed on instant messages, and other sources of information, such as stock tickers, and so forth.

In general, a sender-recipient structural relationship may be considered in the classification process. If the user is substantially the only recipient of a message, for example, then this message may be considered as more important than a message sent to a small number of people. In turn, a message sent to a small number of people may be more important than a message on which the user is blind-copied (bcc'ed) or carbon-copied (cc'ed). With respect to the sender, criticality may be assigned based on whether the sender's name is recognized. Criticality may also be assigned depending on whether the sender is internal or external to the organization of which the user is associated.

Other distinctions that may be considered in classification include the length of the message, whether questions have been detected, and whether the user's name is in the message. Language associated with time criticality may increase the message's importance. For example, phrases such as "happening soon," "right away," "as soon as possible," "ASAP," and "deadline is," may render the message more critical. Usage of past tense as compared to future tense may be considered, as well as coordinative tasks specified by phrases such as "get together," "can we meet," and so on. Evidence of junk mail may lower the priority of a message. Predicates representing combinations, such as a short question from a sender proximate to the user in the organization chart, may also be considered in the classification process.

Figure 13:
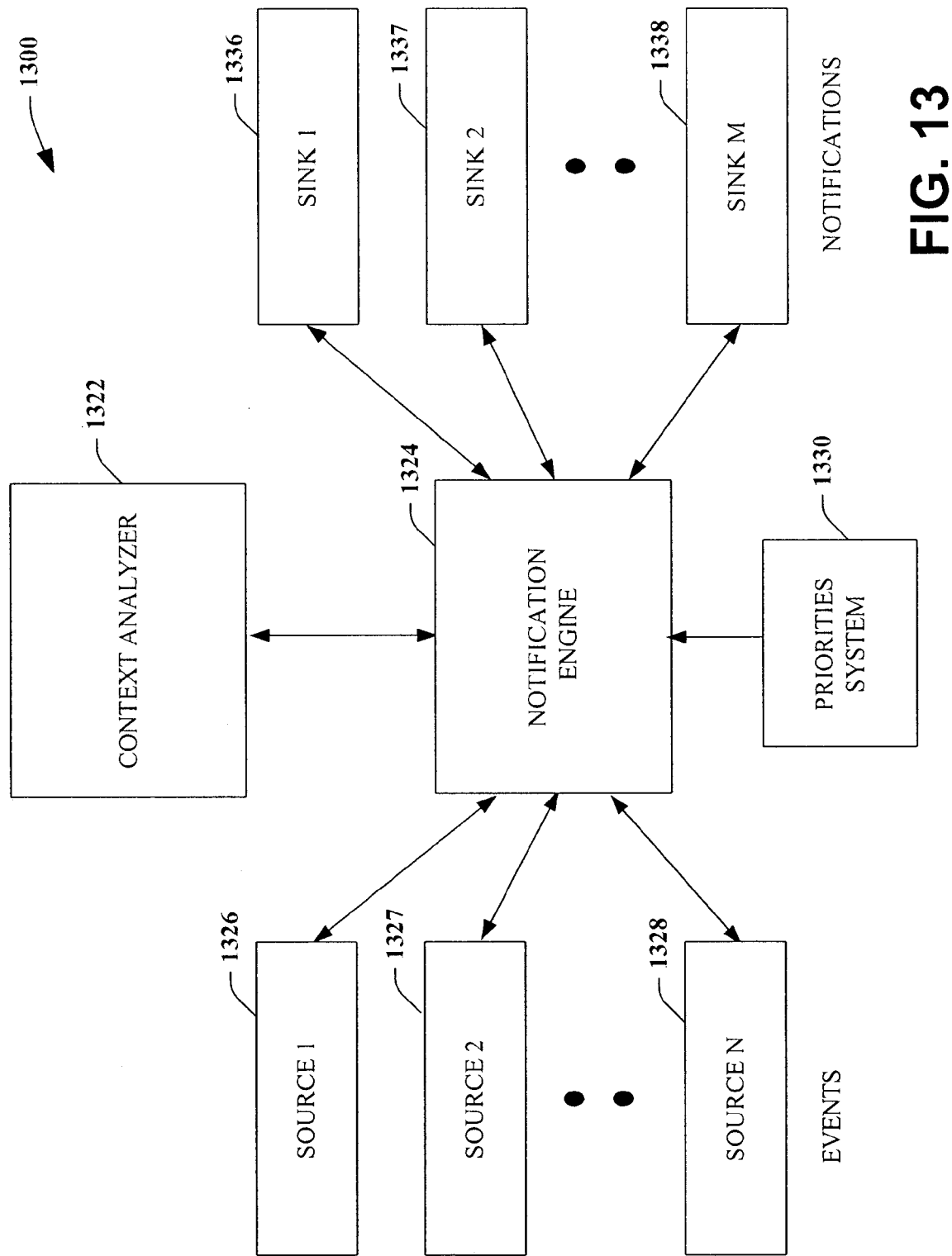
FIG. 13 is a schematic block diagram illustrating systematic cooperation between a notification engine and a context analyzer according to an aspect of the present invention.

Turning now to FIG. 13, a system 1300 illustrates how a notification engine and context analyzer function together according to an aspect of the present invention. The system 1300 includes a context analyzer 1322, a notification engine 1324, one or more notification sources 1 through N, 1326, 1327, 1328, a priorities system 1330, which can operate as a notification source, and one or more notification sinks, 1 through M, 1336, 1337, 1338, wherein N an M are integers, respectively. The sources are also referred to as event publishers, while the sinks are also referred to as event subscribers. There can be any number of sinks and sources. In general, the notification engine 1324 conveys notifications, which are also referred to as events or alerts, from the sources 1326-1328 to the sinks 1336-1338, based in part on parametric information stored in and/or accessed by the context analyzer 1322.

The context analyzer 1322 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 1324, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 1322, according to one aspect of the present invention is inclusive of contextual information determined by the analyzer. The contextual information is determined by the analyzer 1322 by discerning the user's location and attentional status based on one or more contextual information sources (not shown), as is described in more detail in a later section of the description. The context analyzer 1322, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 1326-1328, 1330 generate notifications intended for the user and/or other entity. For example, the sources 1326-1328 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 1330 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 1326-1328 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

- e-mail desktop applications such as calendar systems;
- computer systems (e.g., that may alert the user with messages that information about alerts about system activity or problems);
- Internet-related services, appointment information, scheduling queries;
- changes in documents or numbers of certain kinds of documents in one or more shared folders;
- availability of new documents in response to standing or persistent queries for information; and/or,
- information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 1336-1338 are able to provide notifications to the user. For example, such notification sinks 1336-1338 can include computers, such as desktop and/or laptop computers, handheld computers, cell phones, landline phones, pagers, automotive-based computers, as well as other systems/applications as can be appreciated. It is noted that some of the sinks 1336-1338 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 1324 accesses the information stored and/or determined by the context analyzer, and determines which of the notifications received from the sources 1326-1328 to convey to which of the sinks 1336-1338. Furthermore, the notification engine 1324 can determine how the notification is to be conveyed, depending on which of the sinks 1336-1338 has been selected to send the information to.

For example, it may be determined that notifications should be summarized before being provided to a selected sinks 1336-1338.

The invention is not limited to how the engine 1324 makes its decisions as to which of the notifications to convey to which of the notification sinks, and in what manner the notifications are conveyed. In accordance with one aspect, a decision-theoretic analysis can be utilized. For example, the notification engine 1324 can be adapted to infer important uncertainties about variables including a user's location, attention, device availability, and amount of time until the user will access the information if there were no alert. The notification engine 1324 can then make notification decisions about whether to alert a user to a notification, and if so, the nature of the summarization and the suitable device or devices to employ for relaying the notification. In general, the notification engine 1324 determines the net expected value of a notification. In doing so, it can consider the following:

- the fidelity and transmission reliability of each available notification sink;
- the attentional cost of disturbing the user;
- the novelty of the information to the user;
- the time until the user will review the information on his or her own;
- the potentially context-sensitive value of the information; and/or,
- the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 1324 can make decisions as to one or more of the following:

- what the user is currently attending to and doing (based on, for example, contextual information);
- where the user currently is;
- how important the information is;
- what is the cost of deferring the notification;
- how distracting would a notification be;
- what is the likelihood of getting through to the user; and,
- what is the fidelity loss associated with the use of a specific mode of a given notification sink.

Therefore, the notification engine 1324 can perform an analysis, such as a decisiontheoretic analysis, of pending and active notifications, evaluates context-dependent variables provided by information sinks and sources, and infers selected uncertainties, such as the time until a user is likely to review information and the user's location and current attentional state.

Furthermore, the notification engine 1324 can access information stored in a user profile by the context analyzer 1322 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 1324 determines how and whether to notify the user.

According to one aspect of the present invention, the notification platform architecture 1300 can be configured as a layer that resides over an eventing or messaging infrastructure. However, the invention is not limited to any particular eventing infrastructure. Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks such as endpoint devices receive notifications, alerts and events, for example. The present invention is not so limited, however.

Figure 14:
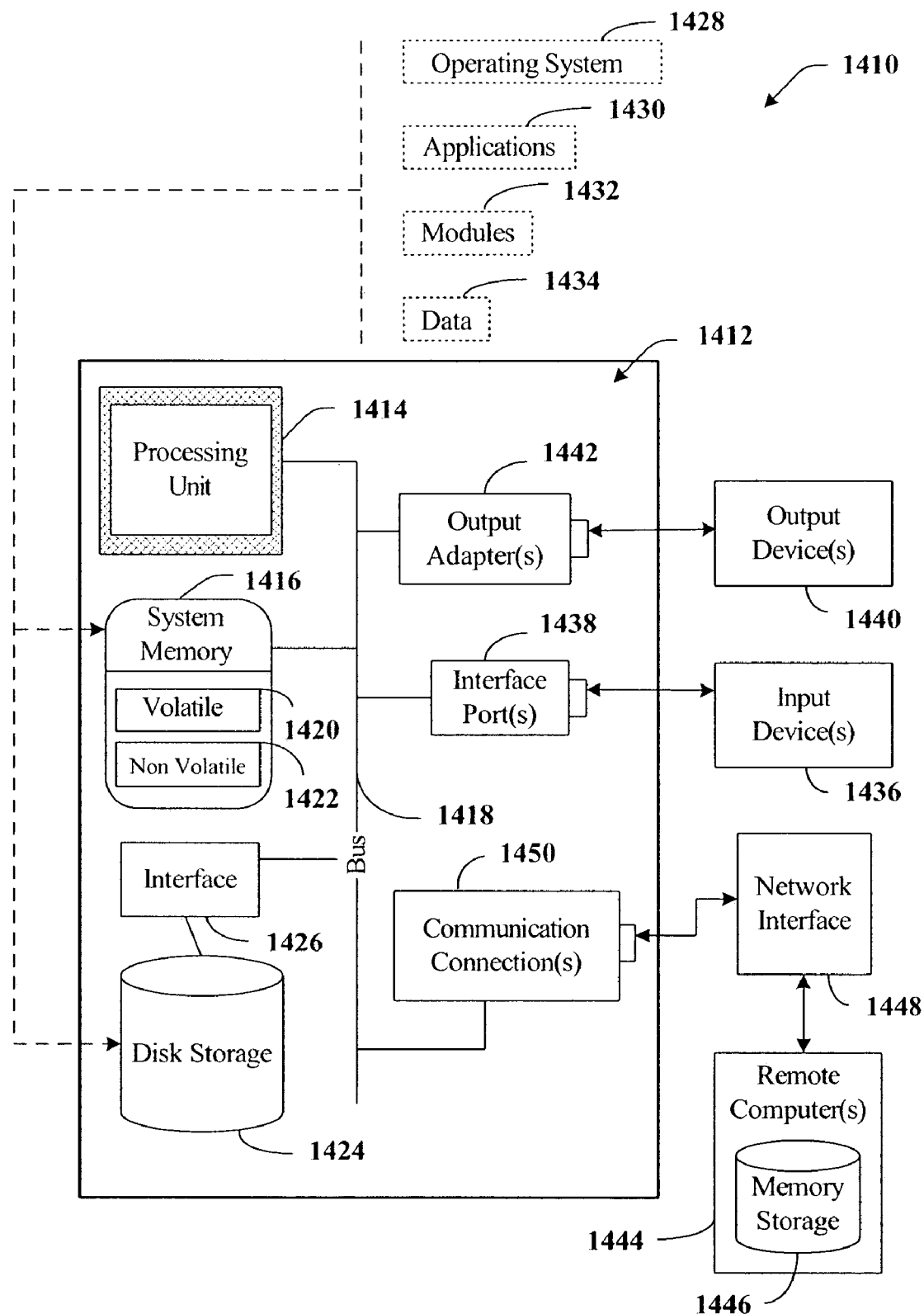
FIG. 14 is a schematic block diagram illustrating a suitable operating environment in accordance with an aspect of the present invention.

With reference to FIG. 14, an exemplary environment 1410 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multi-processor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

Figure 15:
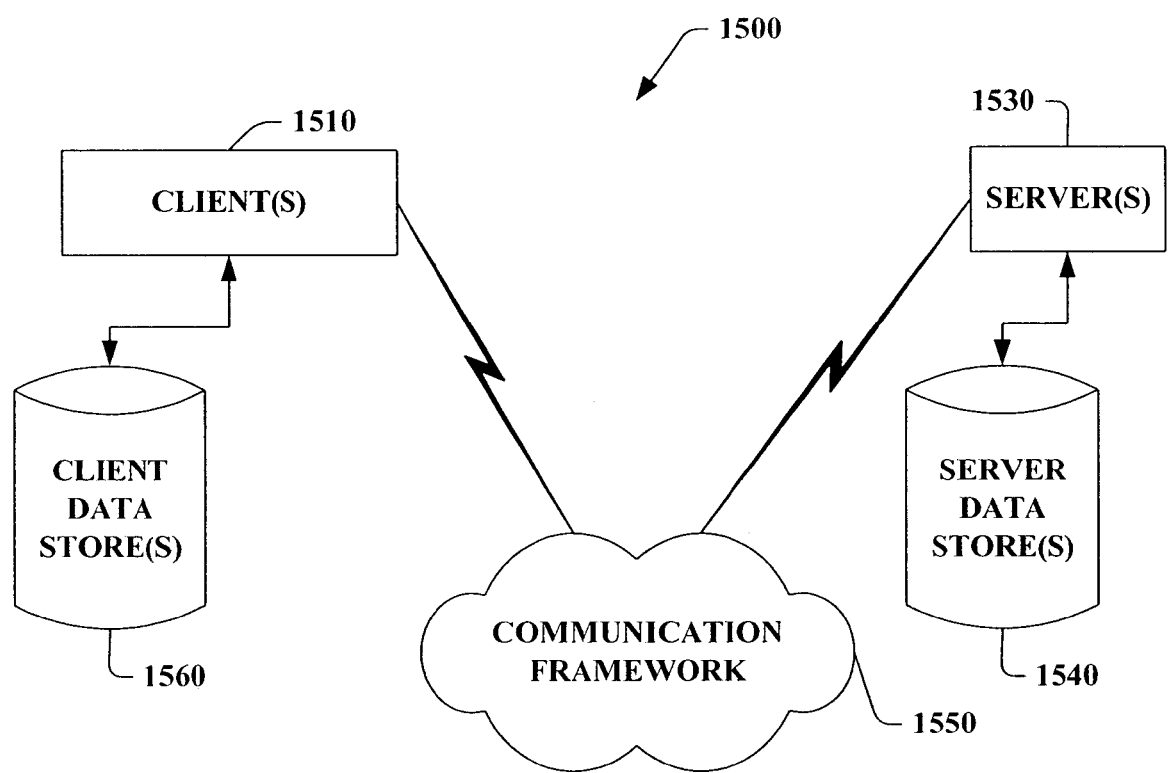
FIG. 15 is a schematic block diagram of a sample-computing environment with which the present invention can interact.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The servers 1530 can house threads to perform transformations by employing the present invention, for example. One possible communication between a client 1510 and a server 1530 may be in the form of a data packet adapted to be transmitted between two or more computer processes. The system 1500 includes a communication framework 1550 that can be employed to facilitate communications between the client(s) 1510 and the server(s) 1530. The client(s) 1510 are operably connected to one or more client data store(s) 1560 that can be employed to store information local to the client(s) 1510. Similarly, the server(s) 1530 are operably connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that filters received messages, the system is recorded on a computer-readable storage medium and capable of execution by a computer, comprising:
   a bulk filter to categorize one or more received messages according to a range of classification, the range spanning from a bulk classification of values to a non-bulk classification of values, the bulk filter employs an expected urgency computation followed by a weighting computation to determine whether messages are bulk;
   at least a second filter to further classify the received messages in order to automatically facilitate processing of the messages, the second filter is an urgency filter that is employed to assign urgency scores, the urgency filter employs a utility model that assigns an expected cost of delayed review for urgent and non-urgent messages; and
   an importance filter that acts in parallel to the urgency filter and is employed to determine the importance of non-bulk messages;
   wherein the bulk filter computes a bulk score or discretized states of the bulk score, as a direct input to the second filter forming a cascaded filter, a classifier is then constructed that employs the bulk score to further classify the received messages; and
   a notification platform that directs prioritized messages to one or more notification sinks, the notification platform receives the prioritized messages and makes decisions regarding when, where, and how to notify a user by determining a current notification sink, likely location and likely focus of attention of the user, such that if a high importance e-mail is received, the notification platform determines the users location and reformats the message to the notification sink associated with the user and if a lower priority message is received, the notification platform configures to leave the e-mail in the user's in-box for later review as desired.

2. The system of claim 1, the range of classification includes a continuum of values based on a likelihood that the received messages are determined to tend toward the bulk classification of values or toward the non-bulk classification of values.

3. The system of claim 1, the bulk filter further comprises an adjustable threshold setting to determine differences between the bulk classification of values and the non-bulk classification of values.

4. The system of claim 1, the messages include at least one of an email and a voice encoded text file.

5. The system of claim 1, at least one of the bulk filter and the second filter examine new messages and annotate the messages with an urgency value, represented in an urgency field, and a likelihood value of bulk email, represented in a bulk email field.

6. The system of claim 5, further comprising a policy component that includes policies or rules for considering inferences relating to message urgency and/or bulk considerations.

7. The system of claim 6, the rules or policies are employed by the policy component to reassign bulk messages of a higher than threshold likelihood of being bulk into a folder for later review.

8. The system of claim 7, further comprising reassigning remaining email that are classified by urgency in another folder.

9. The system of claim 1, further comprising a user interface having at least one of threshold settings, training settings, and bypass settings for interacting with the bulk filter and the second filter.

10. The system of claim 9, further comprising a header analyzer to automatically remove consideration of some messages from the bulk filter.

11. The system of claim 10, further comprising marking messages as an internal to invoke a bypass mechanism.

12. The system of claim 1, further comprising a component to compute an initial value determination following by a time dependent cost function.

13. A computer readable medium having computer readable instructions stored thereon for implementing at least one of the bulk filter and the second filter of claim 1.

14. A method that facilitates message processing, comprising:
   employing a first filter to determine a bulk message score for a message, the first filter employs an expected urgency computation followed by a weighting computation to determine whether messages are bulk;
   employing a second filter to determine an urgency score for the message, the second filter employs a utility model that assigns an expected cost of delayed review for urgent and non-urgent messages;
   employing a third filter that acts in parallel to the second filter to determine importance of non-bulk messages;
   sorting the bulk message from other messages based upon at least one of the bulk message score, the urgency score, and the importance score;
   computing a bulk score or discretized states of the bulk score, as a direct input to the second filter to form a cascaded filter;
   constructing a classifier that takes into consideration the bulk score; and
   employing a notification platform that directs prioritized messages to one or more notification sinks, the notification platform receives the prioritized messages and makes decisions regarding when, where, and how to notify a user by determining a current notification sink, likely location and likely focus of attention of the user, such that if a high importance e-mail is received, the notification platform determines the users location and reformats the message to the notification sink associated with the user and if a lower priority message is received, the notification platform configures to leave the e-mail in the user's in-box for later review as desired.

15. The method of claim 14, further comprising employing an adjustable threshold to facilitate the sorting.

16. The method of claim 14, further comprising employing one or more classifiers to perform at least one of the first filter and the second filter.

17. The method of claim 14, further comprising bypassing at least one of the filters to enable sorting the bulk message from other messages.

18. The method of claim 14, further comprising employing at least one of a parallel combination of filters and a serial combination of filters to enable sorting of the bulk message from the other messages.

19. The method of claim 14, further comprising performing a weighting operation to determine the bulk message score.

20. The method of claim 14, further comprising utilizing an importance classifier followed by an urgency classifier to categorize bulk messages.

21. The method of claim 14, further comprising utilizing an initial value filter followed by a time dependent cost filter.

22. A method that facilitates message processing, comprising:

employing a first filter to determine a bulk message score for a message, the first filter employs an expected urgency computation followed by a weighting computation to determine whether messages are bulk;

employing a second filter to determine an importance score for the message;

employing a third filter that acts in parallel to the second filter to determine an urgency score for the message, the third filter employs a utility model that assigns an expected cost of delayed review for urgent and non-urgent messages;

sorting the bulk message from other messages based upon at least one of the bulk message score, the importance score, and the urgency score;

computing a bulk score or discretized states of the bulk score, as a direct input to the second filter to form a cascaded filter;

constructing a classifier that takes into consideration the bulk score; and employing a notification platform that directs prioritized messages to one or more notification sinks, the notification platform receives the prioritized messages and makes decisions regarding when, where, and how to notify a user by determining a current notification sink, likely location and likely focus of attention of the user, such that if a high importance e-mail is received, the notification platform determines the users location and reformats the message to the notification sink associated with the user and if a lower priority message is received, the notification platform configures to leave the e-mail in the user's in-box for later review as desired.

* * * * *